United States Patent
Hu

(10) Patent No.: US 9,659,548 B2
(45) Date of Patent: May 23, 2017

(54) AUTOMATIC INSTALLATION METHOD FOR VIDEO WALL AND RELATED SYSTEM

(71) Applicant: ATEN International Co., Ltd., New Taipei (TW)

(72) Inventor: Jhe-Yi Hu, New Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 213 days.

(21) Appl. No.: 14/589,871

(22) Filed: Jan. 5, 2015

(65) Prior Publication Data

US 2016/0086582 A1    Mar. 24, 2016

(30) Foreign Application Priority Data

Sep. 18, 2014    (TW) .............................. 103132320 A

(51) Int. Cl.
  *G09G 5/32*      (2006.01)
  *G06F 3/14*      (2006.01)
  (Continued)

(52) U.S. Cl.
  CPC ............... *G09G 5/32* (2013.01); *G06F 3/147* (2013.01); *G06F 3/1446* (2013.01);
  (Continued)

(58) Field of Classification Search
  CPC ........ G06F 3/1446; G06F 3/147; G06F 3/005; G06F 3/04897; G06F 3/1438;
  (Continued)

(56) References Cited

U.S. PATENT DOCUMENTS 8,665,366 B2    3/2014  Lien
2008/0100805 A1  5/2008  Majumder et al.
(Continued)

FOREIGN PATENT DOCUMENTS

TW    200541332        12/2005
TW    201413517         4/2014
TW    201423721 A1      6/2014

OTHER PUBLICATIONS

Extended European Search Report in counterpart application EP 15152978.1, dated Mar. 27, 2015.
(Continued)

*Primary Examiner* — Hong Zhou
(74) *Attorney, Agent, or Firm* — Chen Yoshimura LLP

(57) ABSTRACT

An automatic installation method for video wall comprises the following steps. In the step (a), it employs a control system to output a plurality of identifiable images to a plurality of video devices of the video wall. In the step (b), it employs an image capturing device to capture the plurality of identifiable images. In the step (c), based-on the plurality of identifiable images, it employs the image capturing device to determine position data for the video devices, frame dimension of each of the video devices and spacings between adjacent video devices, and calibrate the identifiable images to obtain a setting value thereof. In the step (d), based-on the position data for the video devices, the frame dimension of each of the video devices and spacings between adjacent video devices and the setting value, it employs the control system to install and set-up the video wall automatically.

14 Claims, 5 Drawing Sheets

(51) Int. Cl.
*G06F 3/147* (2006.01)
*G09G 3/20* (2006.01)

(52) U.S. Cl.
CPC ..... *G09G 3/2092* (2013.01); *G09G 2300/026* (2013.01); *G09G 2320/0693* (2013.01); *G09G 2340/0464* (2013.01); *G09G 2354/00* (2013.01); *G09G 2360/04* (2013.01); *G09G 2370/04* (2013.01); *G09G 2370/042* (2013.01); *G09G 2370/22* (2013.01)

(58) Field of Classification Search
CPC ..... G09G 2300/026; G09G 2320/0693; G09G 2340/0464; G09G 2354/00; G09G 2360/04; G09G 2370/04; G09G 2370/042; G09G 2370/22; G09G 3/2092; G09G 5/32; G09G 2356/00
USPC .................................................. 345/1.1–2.3
See application file for complete search history.

(56) References Cited

U.S. PATENT DOCUMENTS

| | | | |
|---|---|---|---|
| 2010/0271286 A1 | 10/2010 | Li et al. | |
| 2010/0328447 A1* | 12/2010 | Watson | G06F 3/1446 348/135 |
| 2011/0047489 A1 | 2/2011 | Orr et al. | |
| 2011/0309999 A1* | 12/2011 | Chang | G03B 21/13 345/1.1 |
| 2012/0013523 A1* | 1/2012 | Jaynes | G06T 11/60 345/1.3 |
| 2012/0050135 A1* | 3/2012 | Glen | G06F 3/1446 345/1.1 |
| 2013/0093647 A1* | 4/2013 | Curtis | G06F 3/1446 345/1.3 |
| 2013/0293443 A1 | 11/2013 | Seo et al. | |
| 2014/0160101 A1 | 6/2014 | Chen et al. | |
| 2014/0193037 A1* | 7/2014 | Stitzinger | G09G 5/12 382/103 |
| 2014/0313103 A1* | 10/2014 | Goel | H04L 67/10 345/2.2 |
| 2014/0355819 A1* | 12/2014 | Naruse | G06F 3/1423 382/103 |

OTHER PUBLICATIONS

Taiwanese Office Action, dated Mar. 1, 2016, in a counterpart Taiwanese patent application, No. TW 103132320.

* cited by examiner ated, a personal digital assistant device.

AUTOMATIC INSTALLATION METHOD FOR VIDEO WALL AND RELATED SYSTEM

BACKGROUND OF THE INVENTION

Field of the Invention

This invention relates to the field of video walls, and in particular, it relates to an automatic installation method for a video wall and a related system.

Description of the Related Art

A video wall (or TV wall) is a device or system that includes multiple monitors (televisions) arranged in a plane to display different portions of an image, so that the multiple monitors can be used as a display device having a large screen.

The multiple monitors of the video wall are coupled to a control computer, which controls the display of each of the multiple monitors. Thus, the user can use the control computer to control any one of the multiple monitors that need to be adjusted.

When constructing a video wall, the user installs the multiple monitors that form the desired shape of the video wall, and connects the multiple monitors to the control computer with cables. The user needs to check the identifying code of each of the multiple monitors that form the video wall. After the user matches each identifying code to a corresponding one of the multiple monitors, the user verifies the relationship between the identifying codes and the physical positions of the multiple monitors registered on the control computer. Thereafter, the user can use the control computer to individually control the multiple monitors.

However, in existing video wall system, the user must individually check the identifying code of each of the multiple monitors, and know the physical position of the multiple monitors corresponding to the identifying codes, before he can correctly operate the control computer to individually adjust the multiple monitors. Thus, the installation of the video wall tends to be difficult.

From the above description, it can be seen that conventional method of setting up a video wall (or TV wall) is highly dependent on manual adjustments, such as identifying the position of each monitor (TV); further, the frame size of the monitors (TV), their display adjustments, and various other parameters need to be manually input, in order to successfully form a complete video wall. Thus, in addition to the difficulties, the whole setup process is complex and cumbersome.

SUMMARY OF THE INVENTION

To address problems of the conventional technology, this invention provides a new installation method for video walls.

An object of the present invention is to provide an automatic installation method and system for video walls.

In one aspect, the present invention provides a method for automatically installing a video wall, which includes: (a) a control system outputting each of a plurality of identifiable images to a corresponding one of a plurality of video devices that form the video wall; (b) an image capturing device capturing the plurality of identifiable images displayed on the video wall; (c) based on the plurality of identifiable images, the image capturing device determining position data for the video devices, a frame dimension of each of the video devices and spacings between adjacent video devices, and calibrating the identifiable images to obtain image calibration setting values; and (d) based on the position data for the video devices, the frame dimension of each of the video devices and spacings between adjacent video devices, and the image calibration setting values, the control system installing and setting up image display of the video wall automatically.

In one aspect, the method further includes, before step (a), connecting the plurality of video devices to the control system without following a predetermined connection relationship.

The method further includes the control system calibrating an image based on the frame dimensions of the plurality of video devices. The video devices may be televisions. The image capturing device may be a smart phone, a tablet computer or a personal digital assistance device.

In another aspect, the present invention provides an image capture device, which includes a processor; an imaging module coupled to the processor; a video wall automatic-installation module coupled to the processor, for processing a plurality of identifiable images which are displayed by a video wall and captured by the imaging module; and a memory coupled to the processor, for storing programs and setting data. The video wall automatic-installation module determines position data for the video devices, a frame dimension of each of the video devices and spacings between adjacent video devices, and calibrates the identifiable images to obtain image calibration setting values.

In yet another aspect, the invention provides a system for automatically installing a video wall, which includes: a control device, including: a CPU; an image input controller; an image output controller; and a first memory; wherein the image input controller, the image output controller and the first memory are electrically coupled to the CPU; and an image capture device, including: a processor; an imaging module; a video wall automatic-installation module; and a second memory; wherein the imaging module, the video wall automatic-installation module and the second memory are electrically coupled to the processor; wherein the video wall automatic-installation module processes an image of the video wall captured by the imaging module, and based on the image, determines position data for the video devices, a frame dimension of each of the video devices and spacings between adjacent video devices, and calibrates the image to obtain image calibration setting values; and wherein the control device, based on the position data for the video devices, the frame dimension of each of the video devices, the spacings between adjacent video devices, and the image calibration setting values, automatically sets up the video wall image.

The advantages and aspects of the present invention can be understood from the preferred embodiments described below and the appended claims.

BRIEF DESCRIPTION OF THE DRAWINGS

It is to be understood that both the following drawings and detailed description are exemplary and are intended to provide further explanation of the invention without limiting its scope.

DETAILED DESCRIPTION OF THE PREFERRED EMBODIMENTS

Embodiments of the present invention are described in detailed below. The description below are for explaining the structure and process of the present invention; they are explanatory and not limiting of the scope of the invention. In addition to the illustrated embodiments, the invention can also be implemented in other embodiments.

An automatic installation method for a video wall according to embodiments of the present invention employs an image capture device that has an imaging lens, coupled with a positioning algorithm, to allow a control system to automatically arrange the video wall based on the user's requirements. After arranging the video wall, the system has a calibration function to ensure that the image displayed by the video wall accurately represents the original image.

The automatic installation method a video wall according to embodiments of the present invention utilizes the image content of the display of the video wall, based on information obtained by the imaging lens of the an image capture device, to automatically set various parameters of the system, so as to quickly complete the setup of the video wall. This is an improvement over conventional video wall systems, where the setup and installation does not use an imaging device to assist in the setup and the setup and installation process is difficult.

Figure 1:
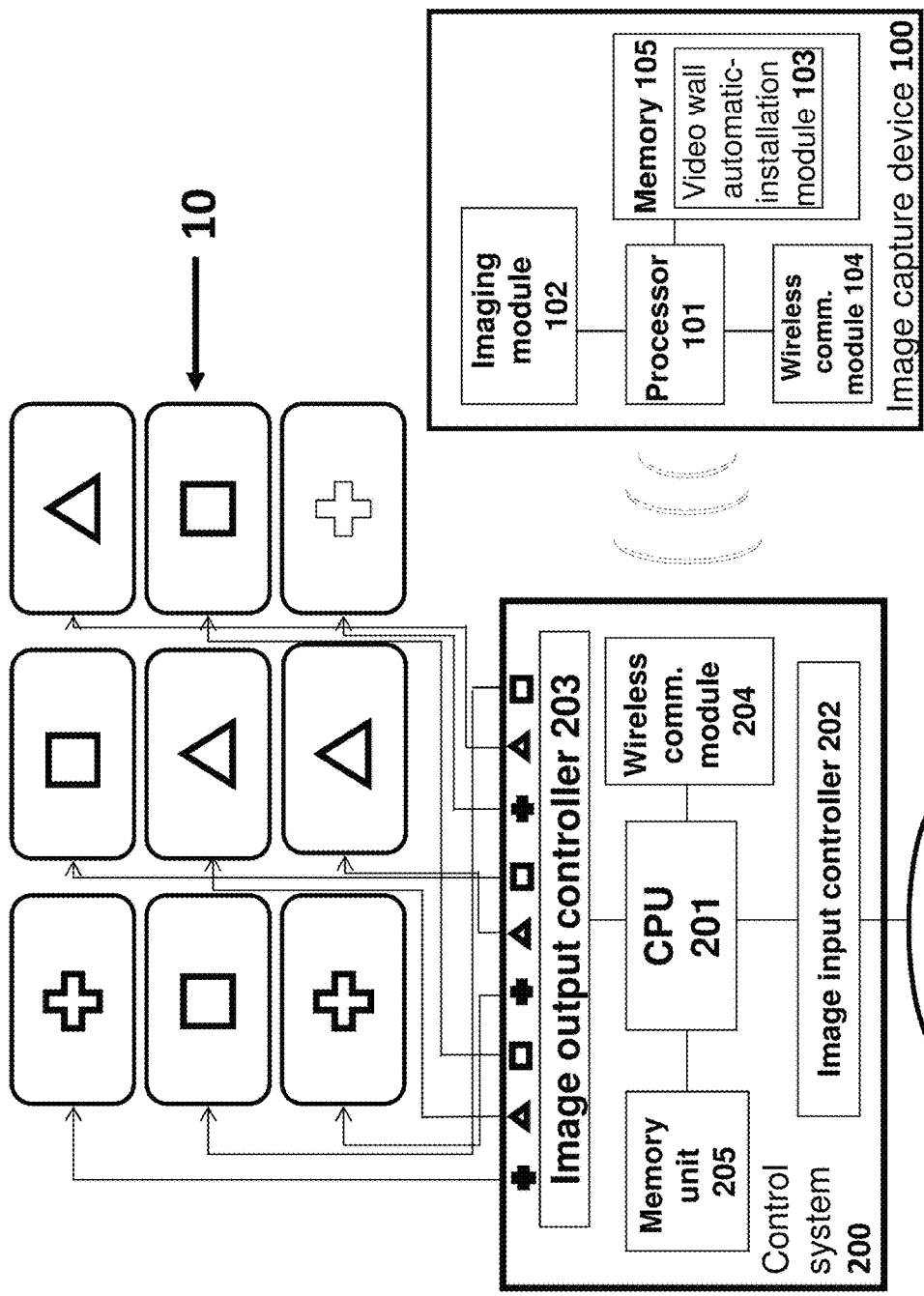
FIG. 1 illustrates an automatic installation system for video walls according to an embodiment of the present invention.

FIG. 1 shows an automatic installation system for a video wall according to embodiments of the present invention. The system includes a video wall (TV wall) 10, a control system (control device) 200 and an image capture device 100. In this embodiment, the control system 200 and the image capture device 100 are two separate devices; in other embodiments, the control system 200 and the image capture device 100 can be integrated into one physical device. In one embodiment, the video wall (TV wall) 10 includes multiple video devices or display devices, spatially arranged in a predetermined pattern. The video device may be, for example, televisions (TV). The display devices may be, for example, LCD displays. In this embodiment, the TV wall 10 includes nine TVs arranged in a 3×3 array. The number and spatial arrangement of the TVs in the TV wall 10 can be varied based on practical needs.

As shown in FIG. 1, the control system 200 includes a CPU 201, an image input controller 202, an image output controller 203, a wireless communication module 204, and memory unit 205. The image input controller 202, image output controller 203, wireless communication module 204 and memory unit 205 are electrically coupled to the CPU 201. In other words, the CPU 201 performs computation and controls the other peripheral devices (including image input controller 202, image output controller 203, wireless communication module 204 and memory unit 205). In one example, the image input controller 202 processes an input signal from a signal source 20, such as a video signal. For example, the control system 200 converts the video (or image) signal from the signal source 20 into a signal format that can be processed by the image output controller 203, such as HDMI format, DVI format, etc. In one example, the image output controller 203 communicates with the TV in the TV wall 10, to output the video (or image) signals received by the image input controller 202. The image output controller 203 can output video signals and transmit it to the TVs of the TV wall 10, so that images are displayed on the TVs of the TV wall 10. In practical applications, the image output controller 203 can also divide the whole image of one video signal using the CPU 201, and output the divided images via multiple output ports to the TVs of the TV wall 10 to display the whole image.

For example, the image output controller 203 is coupled to the multiple output ports (connection ports) of the control system 200. The multiple output ports are coupled to the input ports of the multiple TVs of the TV wall 10, in a one-to-one relationship but with no predetermined correspondence of which output port being coupled to which TV. In this invention, based on the user's desire, the multiple output ports of the control system 200 can be randomly connected with the multiple TVs of the TV wall 10, to form a TV wall. The number of output ports of the control system 200 may be greater than, equal to or less than the number of TVs in the TV wall 10, depending on practical applications.

Thus, by connecting the output ports of the control system 200 to the TVs of the TV wall 10, different identifiable images outputted by the image output controller 203 can be displayed on different TVs of the TV wall 10, and these identifiable images can be used to identify the output port that is connected to each TV of the TV wall 10. For example, the image output controller 203 can output nine different images, each image being outputted by a single one of the output ports, as shown in FIG. 1. Via the different connecting ports, the nine different images outputted by the image output controller 203 are respectively transmitted to the nine TVs located at different spatial locations of the TV wall 10. Therefore, the nine different images are respectively displayed on nine TVs at different locations of the TV wall 10.

The above-mentioned wireless communication module 204 is a communication unit, for wirelessly communicating with the image capture device 100. In on embodiment, the communication unit includes a wireless communication unit or a wired communication unit. A wired communication unit communicates with the image capture device 100 via wired means. For example, the connection (or communication) means between the image capture device 100 and the control system 200 can include: (1) output port and input port connected to each other physically; (2) wireless connection methods, via respective wires communication modules in each device; and (3) by using a connection cable. The memory unit 205 can store programs and setting data.

In one example, the image capture device 100 is a smart phone, tablet computer, personal digital assistant (PDA), etc. For example, the image capture device 100 includes a processor 101, an imaging module 102, a video wall automatic-installation module 103, a wireless communication module 104 and a memory 105. The processor 101 executes programs and controls peripheral devices (including imaging module 102, video wall automatic-installation module 103, wireless communication module 104 and memory 105). The memory 105 stores programs and setting parameters. In one implementation, the video wall automatic-installation module 103 is an application program, and can be downloaded by the user for execution. For example, the video wall automatic-installation module 103 can be stored in the memory 105 of the image capture device 100. The wireless communication module 104 of the image capture device 100 communicates wirelessly with the wireless communication module 204 of the control system 200. In some embodiments, the image capture device 100 may includes a wired connection unit (such as internet, Ethernet, USB connections, etc.), to connect to the control system 200 by wired means.

Figure 2:
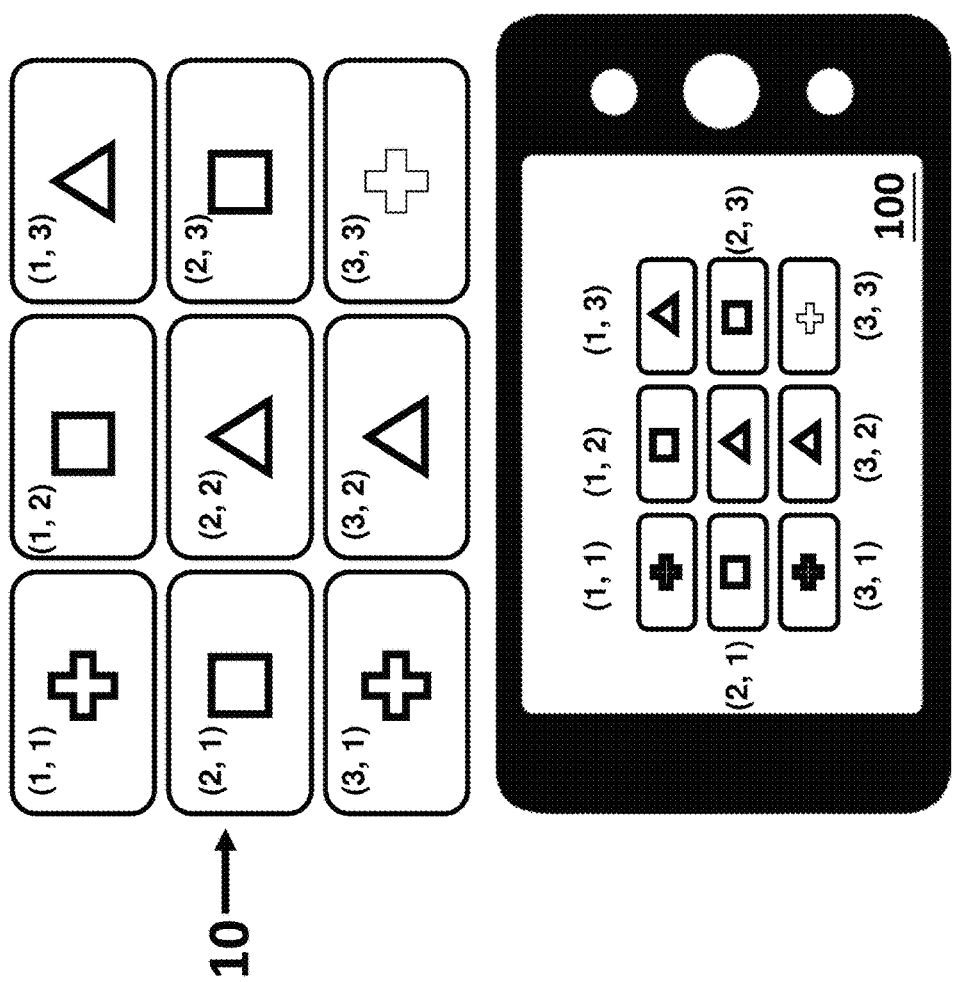
FIG. 2 illustrates the images displayed by the video wall and as captured and displayed on a screen of the image capture device.

The imaging module 102 is used to capture the image on the TV wall 10. Using the imaging function of the imaging module 102, the image capture device 100 can obtain an image displayed on the TV wall 10. For example, the nine different TVs of the TV wall 10 are arranged in a 3×3 array, where the positions are labeled (1,1), (1,2), (1,3), (2,1), (2,2), (2,3), (3,1), (3,2) and (3,3) as shown in FIG. 2. Using the imaging module 102, the image capture device 100 obtains the nine different images displayed on the nine TVs located at different positions. Thus, the images on the TV wall 10 can be displayed on the display screen of the image capture device 100, as shown in FIG. 2. Then, after processing and calculation by the video wall automatic-installation module 103, the arrangement order of the TVs of the TV wall 10 can be obtained. Here, arrangement order refers to the correspondence between the output ports of the control system and the positions (1,1), (1,2), . . . of TVs of the TV wall. The arrangement order calculated this way can be transmitted to the control system 200. This way, the video wall automatic-installation module 103 can provide setup information for automatically installing the video wall, to assist the control system 200 to accomplish automatic installation of the TV wall.

In one embodiment, the image capture device 100 can download special application software as the video wall automatic-installation module 103. The download can be accomplished via wireless or wired transmission, or by copying from a storage medium (such as optical disk or other portable storage devices). For example, the video wall automatic-installation module 103 can be downloaded via wireless means from a wireless download platform and stored in the image capture device 100. Therefore, the video wall automatic-installation module 103 according to embodiments of the present invention can be downloadable application software. When the user downloads the software and stores it in the image capture device 100, the image capture device 100 can execute this application software to provide setup information for automatically installing the video wall, to accomplish automatic installation of the TV wall.

Figure 5:
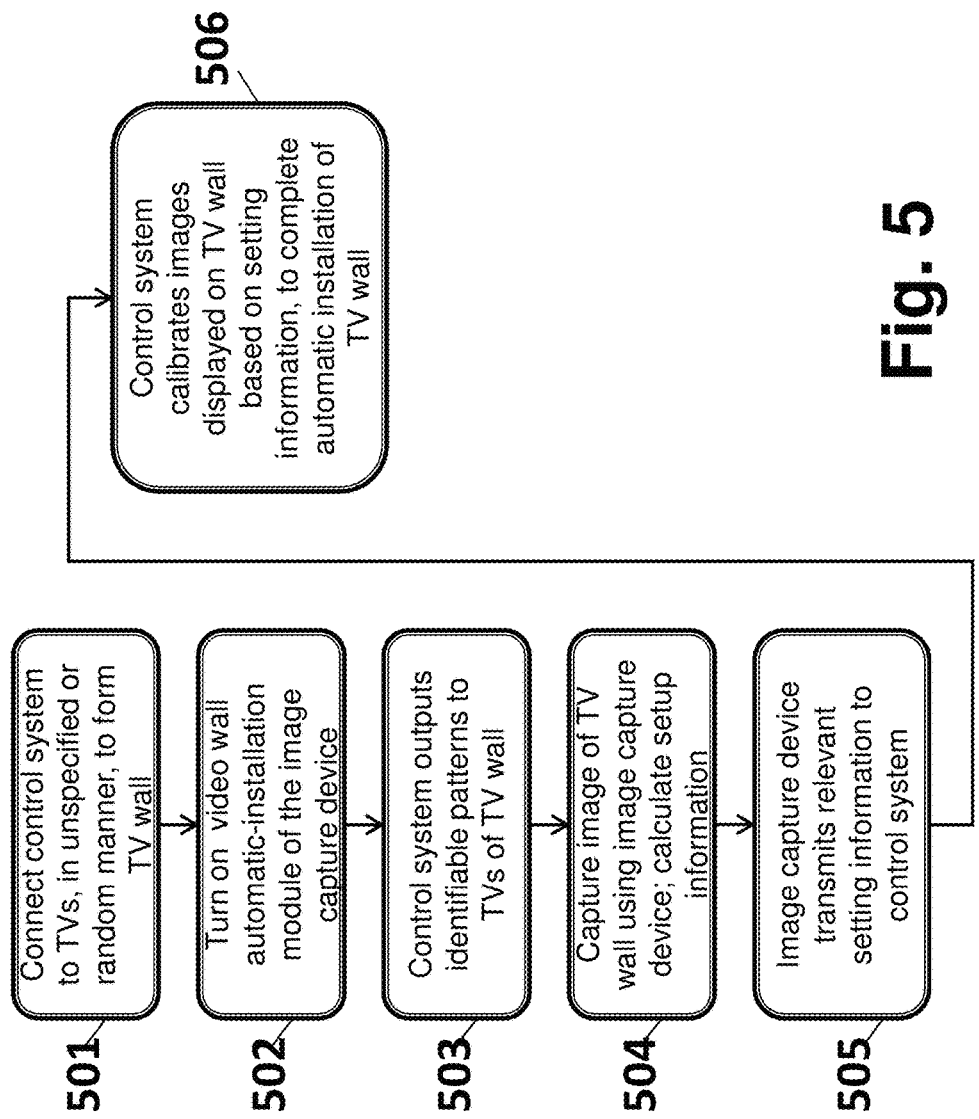
FIG. 5 illustrates a process of automatically installing the video wall according to an embodiment of the present invention.

The automatic installation process for video walls according an embodiment of the present invention is shown in FIG. 5. First, in step 501, the control system is connected to the TVs, in an unspecified or random manner, to form a TV wall. As described earlier, the control system 200 is connected to the multiple TVs of the TV wall 10, where the multiple output ports (connection ports) of the control system 200 are connected to the input ports of the multiple TVs of the TV wall 10, in a one-to-one relationship but with no predetermined correspondence of which output port being coupled to which TV. The multiple output ports of the control system 200 can be randomly connected with the multiple TVs of the TV wall 10, to form a TV wall, as shown in FIG. 1. Then, in step 502, the video wall automatic-installation module of the image capture device is turned on. In this step, the video wall automatic-installation module 103 of the image capture device 100 is turned on to assist in the subsequent automatic installation of the TV wall. In step 503, the control system outputs identifiable images to the TVs of the TV wall. In this step, the image output controller 203 of the control system 200 outputs multiple different identifiable images, via the respective different output ports, to the TVs located at different positions (e.g. (1,1), (1,2), . . . ) of the TV wall 10. These identifiable images can be used to identify the output port that corresponds to each TV of the TV wall 10, as shown in FIG. 1. Then, in step 504, the image of the TV wall is obtained using the image capture device, and the setup information is calculated. In this step, the image capture device 100 uses the imaging module 102 to obtain the images of the different TVs located at different positions of the TV wall 10, and displays the images of the TV wall 10 on the display screen of the image capture device 100, as shown in FIG. 2. After obtaining the images of the TVs of the TV wall 10, the video wall automatic-installation module 103 is executed to calculate the setup information for installing the TV wall. The calculation performed by the video wall automatic-installation module 103 includes at least: (i) identifying the arrangement order of the multiple TVs of the TV wall 10; (ii) determining the frame dimensions and distances; and (iii) calculating the display effect of the image on each individual TV and performing calibration. Thus, the relevant setup information includes at least: the positions and arrangement order of the multiple TVs of the TV wall, the frame dimensions of the multiple TVs and the distances between adjacent frames, and the display effect of images on individual TVs.

As described earlier, after the imaging module 102 of the image capture device 100 obtained the images of the TV wall 10, and after processing and calculation by the video wall automatic-installation module 103, the positions and arrangement order of the multiple TVs of the TV wall 10 can be obtained. For example, after the image output controller 203 outputs images to the TV wall 10 and the image capture device 100 obtains the images of the TV wall, by using image recognition techniques, the images and colors of the TV display can be recognized, and the recognition result can be used to obtain the arrangement order of the TV wall 10. The image capture device 100 transmits the position information of the multiple TVs of the TV wall 10 to the control system 200. The control system 200 can use the position information to automatically set up the images of the TV wall 10.

Figure 3:
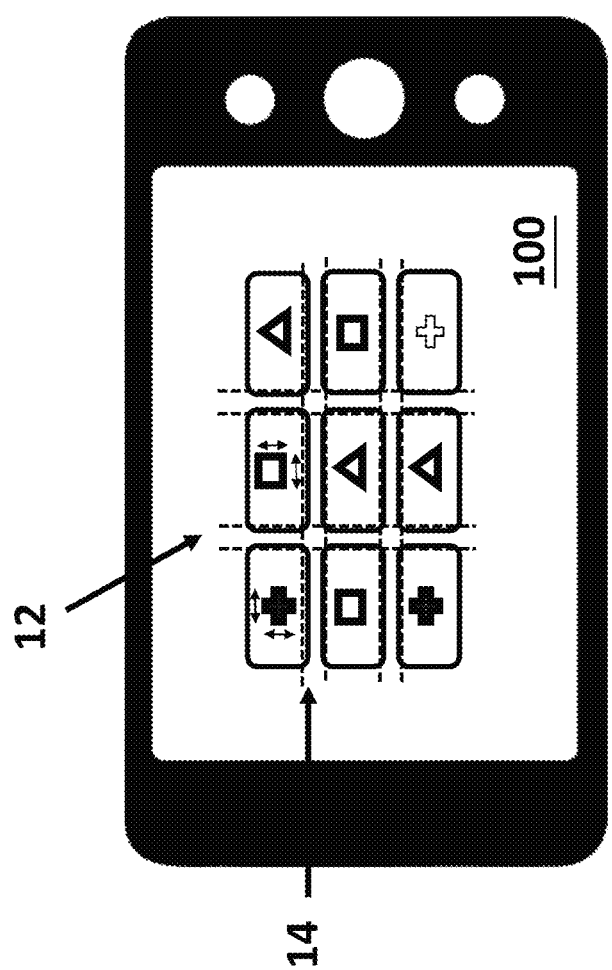
FIG. 3 illustrates the image as captured and displayed on a screen of the image capture device, showing the frame dimension of each TV and the spacing between adjacent TVs.

Moreover, after the image capture device 100 obtains an image of the TV wall 10, by using auxiliary information in the video wall automatic-installation module 103, the frames of the multiple TVs and the distance between adjacent frames can be calculated, and the actual physical frame size of each TV of the TV wall 10 and the physical distances between adjacent TVs can be calculated, as shown in FIG. 3. For example, after the image output controller 203 outputs the images to the TV wall 10 and the image capture device 100 obtains the image of the TV wall 10, the length and width of the obtained TV wall image can be used to calculate the ratio between the image length or width and the actual length or width of the TV wall. Based on this ratio, and by recognizing the image frames and distances between them using image recognition, the actual physical distances between TV frames can be calculated. The distances between adjacent TVs include the horizontal spacing 12 and vertical spacing 14.

Figure 4:
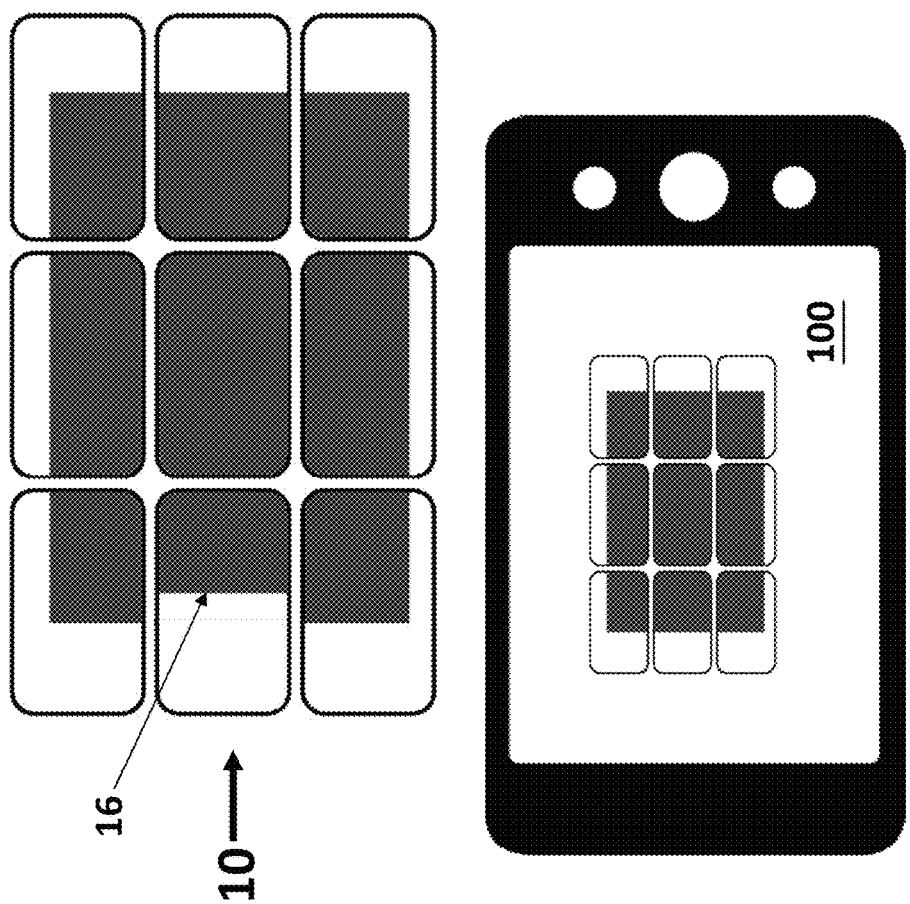
FIG. 4 illustrates a situation according to an embodiment of the present invention when the displayed image of one TV is distorted from the input image, the image capture device corrects the image.

On the other hand, after the image capture device 100 obtains an image of the TV wall 10, the video wall automatic-installation module 103 can calibrate the images based on the image display effects of the obtained images of individual TVs. For example, by comparing the images obtained by the image capture device 100 with the known images outputted by the image output controller 203, the differences between the actually displayed image and the ideal image can be observed, and the system can be adjusted until the actually displayed image is the same as the ideal image. After the frame information of each TV of the TV wall 10 is set up, the system can already display the whole TV wall image. However, it is possible that some individual TVs may display the source image incorrectly, as shown in FIG. 4, image 16. In such a case, the image capture device 100 needs to perform a calibration, to provide a calibration setting value to the control system 200 in order to correct the image. The TV wall 10 can display an image to be used for calibration; after taking an image of the TV wall 10 using the image capture device 100, the video wall automatic-installation module 103 can calculate the display effect of each individual TV, and perform calibration. In the illustrated example, the image display effect is a horizontal shift of the displayed image. Other image display effects can be calibrated for, such as other spatial distortion, brightness and color settings, etc.

Then, in step 505, the image capture device transmits the relevant setting information to the control system. In this step, the image capture device 100 will transmit the above calculation result (data), including the position information of the TVs, the spacing between frames of adjacent TVs, image calibration setting values, to the control system 200, either simultaneously or sequentially. Lastly, in step 506, the control system calibrates the images displayed on the TV wall based on the setting information, to complete the automatic installation of the TV wall. In this step, based on the position information of the TVs, the frame dimensions of the TVs and the spacing between frames of adjacent TVs, and the image calibration setting values provided by the image capture device 100, the control system 200 completes the image calibration and installation of the TV wall 10.

Also, it should be noted that in another embodiment, the video wall automatic-installation module 103 can be a part of the control system 200; the image capture device 100 obtains the image of the TV wall 10 and provides it directly to the control system 200, and the control system 200 performs the subsequent steps of calculating the setting information and calibrating the image.

The method of automatically install and set up video walls according to embodiments of the present invention has the following advantages:

1. By using image recognition, after the TV wall is assembled, the positions of the TVs can be set automatically using programs, and the process is made easy.

2. After the positions of the TVs are set, the system can automatically calibrate the images, to make sure that the output image of the TV wall accurately represents the original source image.

It will be apparent to those skilled in the art that various modification and variations can be made in the method and system of the present invention without departing from the spirit or scope of the invention. Thus, it is intended that the present invention cover modifications and variations that come within the scope of the appended claims and their equivalents.

What is claimed is:

1. A method for automatically installing a video wall, comprising:
    (a) an image output controller outputting each of a plurality of identifiable images to a corresponding one of a plurality of video devices that form the video wall;
    (b) an imaging device capturing the plurality of identifiable images displayed on the video wall;
    (c) based on the plurality of identifiable images, a first processor determining position data for the video devices and spacings between adjacent video devices and frame data of the video devices,
    wherein the first processor obtains a size of an image of the video wall, calculates a ratio between the size and an actual size of the video wall, recognizes image frames of the video devices and distances between the image frames using image recognition, and calculates physical distances, including horizontal spacing and vertical spacing, between the video devices based on the ratio and the recognized distances between the image frames; and
    (d) based on the position data for the video devices, a second processor automatically setting up image display of the video wall, the second processor being same as or different from the first processor.

2. The method of claim 1, further comprising: based on the plurality of identifiable images, the first processor calibrating the identifiable images to obtain an image setting value.

3. The method of claim 2, further comprising: the second processor calibrating images of the video devices based on the image setting value.

4. The method of claim 1, further comprising, before step (a): connecting the plurality of video devices that form the video wall to output ports that are coupled to the image output controller, in a one-to-one relationship without predetermined correspondence between the output ports and the video devices.

5. The method of claim 1, wherein the size is at least one of a length and a width.

6. An image capture device, comprising:
    a processor;
    an imaging module coupled to the processor;
    a memory coupled to the processor; and
    a video wall automatic-installation application program stored in the memory and configured to be executed by the processor, for processing a plurality of identifiable images which are displayed on a video wall and captured by the imaging module, to determine position data for a plurality of video devices that form the video wall and spacings between adjacent video devices and frame data of the video devices, including to obtain a size of an image of the video wall, calculate a ratio between the size and an actual size of the video wall, to recognize image frames of the video devices and distances between the image frames using image recognition, and to calculate physical distances, including horizontal spacing and vertical spacing, between the video devices based on the ratio and the recognized distances between the image frames.

7. The image capture device of claim 6, wherein the video wall automatic-installation application program is configured to be executed by the processor to calibrate the identifiable images to obtain an image setting value.

8. The image capture device of claim 6, wherein the size is at least one of a length and a width.

9. A system for automatically installing a video wall, comprising:
    an image output controller coupled to a plurality of video devices that form a video wall, and outputting one of a plurality of identifiable images to each of the plurality of video devices;
    an imaging device, for capturing the plurality of identifiable images displayed on the video wall;

a first processor; and a memory storing a video wall automatic-installation application program which is configured to be executed by the first processor, for determining position data for the plurality of video devices based on the captured plurality of identifiable images and spacings between adjacent video devices and frame data of the video devices based on the captured identifiable images, including to obtain a size of an image of the video wall, to calculates a ratio between the size and an actual size of the video wall, to recognize image frames of the video devices and distances between the image frames using image recognition, and to calculate physical distances, including horizontal spacing and vertical spacing, between the video devices based on the ratio and the recognized distances between the image frames, a second processor which automatically sets up image display of the video wall based on the position data for the video devices, the second processor being same as or different from the first processor.

10. The system of claim 9, wherein the video wall automatic-installation application program is configured to be executed by the first processor to calibrate the identifiable images to obtain an image setting value.

11. The system of claim 9, wherein the second processor calibrates images of the video devices based on the image setting value, the spacings between adjacent video devices and the frame data of the video devices.

12. The system of claim 9, wherein the imaging device, the first processor and the memory storing the video wall automatic-installation application program form an image capture device and wherein the second processor is different from the first processor.

13. The system of claim 9, wherein the image output controller, the first processor and the memory storing the video wall automatic-installation application program form a control system and wherein the second processor is the same as the first processor.

14. The system of claim 9, wherein the size is at least one of a length and a width.

* * * * *